Sept. 21, 1948.   P. H. DAVEY   2,449,930
COMPRESSOR

Filed Nov. 3, 1943   2 Sheets-Sheet 1

Inventor
Paul H. Davey,
By William P. Hall
Attorney

Sept. 21, 1948. P. H. DAVEY 2,449,930
COMPRESSOR
Filed Nov. 3, 1943 2 Sheets-Sheet 2

Inventor
Paul H. Davey,

By William F. Hall
Attorney

Patented Sept. 21, 1948

2,449,930

UNITED STATES PATENT OFFICE 2,449,930

COMPRESSOR

Paul H. Davey, Kent, Ohio

Application November 3, 1943, Serial No. 508,846

3 Claims. (Cl. 230—206)

The present invention relates to improvements in apparatus for compressing gases, and more specifically pertains to compressors of the reciprocating piston type wherein lubricating oil vapors are entirely excluded from the presence of the compression chamber or chambers to thereby positively prevent admixture of lubricating oils with the gas or gases being compressed.

A compressor or apparatus for compressing gases of a conventional type includes cylinders with pistons reciprocating therein to compress gases in the compression chambers. The reciprocating pistons, the crank shaft, bearings and all bearings associated with the connecting rods of such compressors have customarily been lubricated by means of oil in a fluid state. The lubricating systems of conventional compressors usually include some arrangement for carrying oil onto the cylinder walls for lubricating purposes. Liquid lubricating oil is also supplied to the crank shaft bearings and the wrist pins and other moving parts of the compressor. One of the functions of the piston rings in the conventional compressor is to wipe the largest possible portion of the lubricating oil on the wall of the cylinder back into the crank case. Another function of the piston rings is to provide a seal between the piston and the cylinder wall for the purpose of delivering the largest possible portion of the gases being handled by the compressor. A compressor of this type regardless of the skill and care in precision manufacture thereof delivers some lubricating oil into the compression chamber where the oil is mixed with the gas being compressed.

The prior art includes various baffle arrangements in association with the lubricating systems in an effort to prevent oil from passing into the compression chamber for admixture with the gases being compressed therein. The various baffle arrangements employed in the past have not been entirely satisfactory since lubricating oil still finds its way into the compression chamber.

One use of compressed air wherein even small traces of oil vapors are objectionable is that of supplying air to divers, or individuals working below the surface of the water in salvage operations and the like. It is accordingly a primary object of the present invention to provide apparatus for compressing gases including air into which it is either undesirable or dangerous to introduce even an insignificant quantity of lubricating oil because either of the possibility of developing an explosive mixture or contaminating the gases which must be maintained in a pure form in the compressed state.

A more specific object of the invention pertains to the provision of self-lubricating bearings associated with a crank shaft and the connecting rods of a compressor wherein liquid lubricating oil is completely excluded, and the pistons of the compressor are provided with piston rings and the like which provide a friction reducing film on the wall of the cylinder to thereby avoid the development of obnoxious lubricating oil vapors which may pass into the compression chamber.

A still further object of the invention resides in providing an oil-less compressor wherein air and other gases may be compressed to the desired state without the possibility of lubricating oil vapors being included in the compressed gas or air.

Other objects and features of the invention will be more apparent upon a consideration of the accompanying drawings and the following detailed description wherein an exemplary embodiment of the invention is disclosed.

In carrying out the invention all moving parts of the compressor including the bearings and the cylinder surfaces are lubricated to reduce friction between the moving parts without the use of liquid lubricating oil. Thus the compressor is devoid of an oil pump, oil filter and oil lines. In view of the fact that no liquid lubricating oil is employed to reduce friction between the moving parts of the compressor, it is impossible for the compressed gases or air to be contaminated or mixed with oil vapors. Thus the compressor may be employed to compress air for applying such air to divers or individuals working under water, in salvaging operations and the like. The compressor may likewise be employed for compressing gases into which it is either dangerous or inadvisable to introduce even a thin mist of lubricating oil and thereby eliminate the possibility of developing an obnoxious or explosive mixture of gases.

Figure 2:
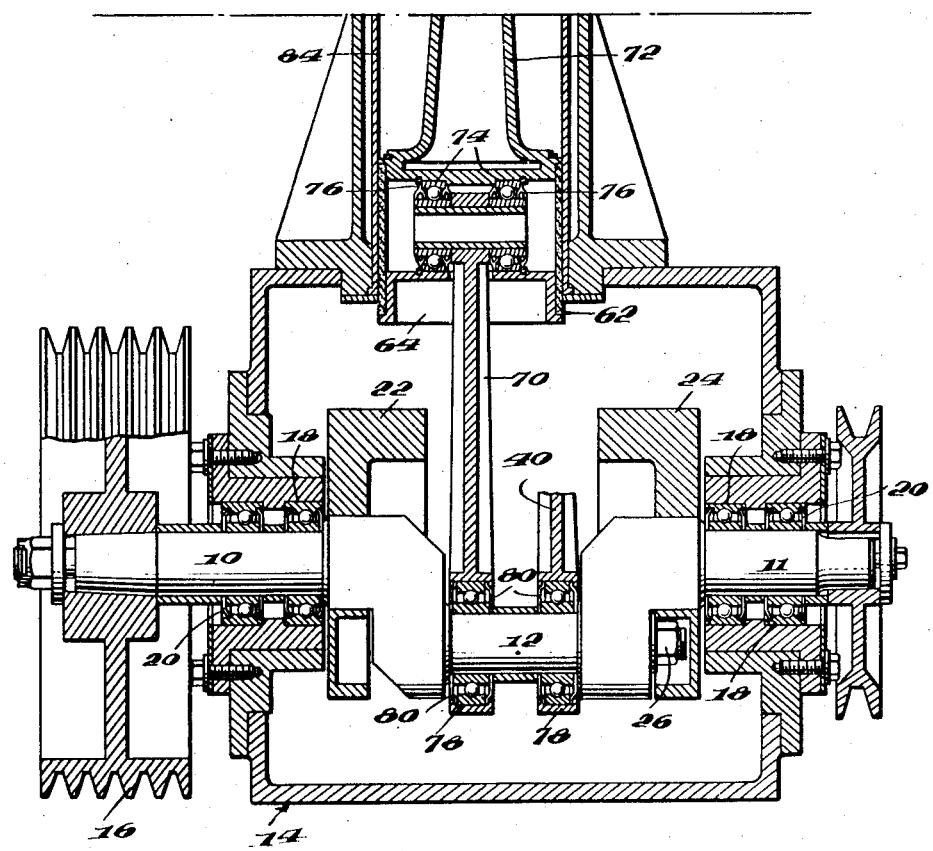
Fig. 2 is an axial sectional view of the crank case and a portion of one of the cylinders.

A compressor exhibiting the invention includes a crank shaft 10 having one or more crank arms 12 rotatably mounted in the end walls of a crank case such as illustrated generally at 14. The crank shaft 10 may be driven in any suitable manner and in the embodiment illustrated a sheave or pulley 16 is rigidly mounted on the end of the crank shaft 10. In carrying out the invention the main bearings for the crank shaft are of a rolling anti-friction type and in the embodiment illustrated these main bearings take the form of ball bearing assemblies 18 as shown particularly in Fig. 2. These ball bearings are permanently pre-lubricated in that a small quantity of grease is provided around the ball races and this grease is permanently sealed in place by means of grease shields 20 as shown more clearly in Fig. 2. This small quantity of grease is sufficient to provide lubrication for the ball bearings 18 during the life of the compressor. Such grease or lubrication for the bearings 18 avoids the necessity of providing liquid lubricating oil in the crank case 14 of the compressor for the main bearings of the crank shaft. The crank shaft 10 is provided with counter-weights 22 and 24 for the purpose of reducing vibration of the rotating assembly and for eliminating vibration of the compressor. In the embodiment illustrated the crank shaft 10 is formed in two parts for facilitating assembly of the connecting rod bearings on the crank arm 12. The counter-weight 24 and the right end portion 11 of the crank shaft as shown in Fig. 2 is suitably secured to the crank arm 12 in any appropriate manner such as by means of the nut shown at 26.

The compressor may include a plurality of cylinders and reciprocating pistons for suitably compressing the gases or air in a number of stages. In the embodiment illustrated a low pressure head assembly is shown generally at 30 in Fig. 1, for initially compressing the air or gases, and this partially compressed air or gases may then be passed to the high pressure head assembly shown generally at 32 in Fig. 1. The lower pressure head assembly includes a cylinder 34 which is preferably formed of a light weight metal such as an aluminum alloy for the initial purpose of lightness, and for the further function of providing a high rate of heat transfer from the compression chamber and associated parts of the compressor. The outer surface of the cylinder 34 may be provided with heat dissipating fins 35. The cylinder 34 is provided with a lining 36 which may be formed of steel or other suitable wear resistant metal.

A piston 38 is mounted within the cylinder 34 and adapted to be reciprocated therein for compressing the gases. The piston 38 is reciprocated within the cylinder 34 by means of a connecting rod 40. The connecting rod extends between the crank arm 12 of the crank shaft and a guide member or guide piston 42 for the piston 38. The guide piston 42 is mounted for sliding movement within a guide tube 44 and this tube may be regarded as a guide cylinder having the axis thereof substantially in alignment with the axis of the cylinder 34. The guide tube or sleeve 44 is preferably formed of steel, and is mounted within a housing 46 which supports the cylinder 34 on the crank case 14. The crank case and the housing 46 may likewise be formed of some light weight metal alloy such as an aluminum alloy for the purpose of reducing the weight of the compressor and for providing a high rate of heat dissipation.

As hereinabove indicated, no liquid lubricating oil is employed for reducing the friction between the moving parts of the compressor, and no liquid lubricating oil is supplied to the cylinder walls. A feature of the invention includes self-lubricating piston rings and a self-lubricating sleeve on the guide piston 42 to reduce the friction of the parts during the reciprocation of the piston assembly within the main cylinder and the guide cylinder. The piston rings 50 are therefore formed of a material having self-lubricating characteristics such as a high lead-bronze composition or carbon impregnated with graphite. The guide piston 42 is provided with a sleeve 52 formed of a suitable self lubricating composition. Thus the sleeve 52 may be made of a high lead-bronze alloy or carbon impregnated with graphite. Such piston rings 50 and such a guide sleeve 52 furnish all of the lubrication necessary for the operation of the piston in the cylinders. Thus no liquid lubricating oil is necessary on the wall of the lining 36 and the wall of the tube or sleeve 44.

Figure 1:
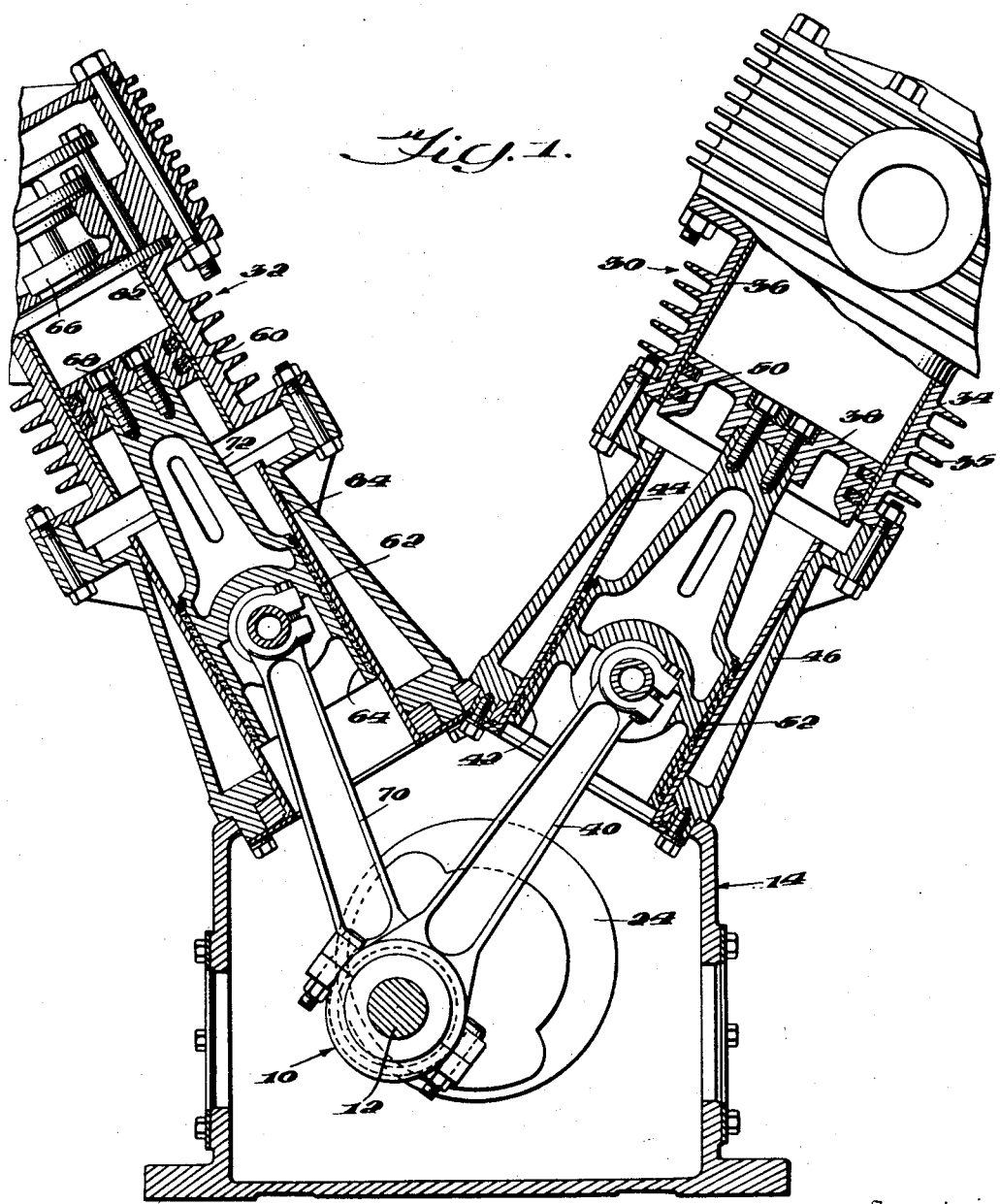
Figure 1 is a transverse sectional view of a compressor embodying the invention.

The high pressure head assembly as shown at 32 in Fig. 1 is similar in structure to that shown and described in connection with the low pressure head assembly 30. The high pressure head is likewise provided with self-lubricating piston rings 60 and a self-lubricating sleeve 62 mounted on the guide piston 64. Preferably expanding devices or rings may be arranged under the piston rings 50 and 60 to expand the piston rings outwardly into engagement with the cylinder walls.

Each pressure head assembly is provided with a discharge valve and this valve is shown at 66, associated with the high pressure head assembly. A similar discharge valve (not shown) is employed in the low pressure head assembly. The cylinder heads are also provided with inlet valves (not shown).

The main piston 68 in the high pressure head assembly is reciprocated by means of a connecting rod 70 extending between the guide piston 64 and crank arm 12. The piston 68 may be rigidly connected with the guide piston 64 in any suitable manner and in the embodiment illustrated is bolted to an extension 72 of the guide piston 64.

The wrist pins for the guide pistons 42 and 64 are provided with anti-friction bearings such as ball bearings 74 as shown particularly in Fig. 2. These ball bearing assemblies are similar in construction to those of the main bearings 18. The ball bearing assemblies 74 associated with each of the wrist pins are prelubricated bearings having a small quantity of grease provided around the ball races and this grease is permanently sealed in place by means of grease shields 76 as shown in Fig. 2. The lower ends of the connecting rods 40 and 70 are connected to the crank arm 12 by means of permanently pre-lubricated ball bearings 78 as shown in Fig. 2. These ball bearings are provided with a small quantity of grease around the ball races and this grease is permanently sealed in place by means of grease shields 80. This small quantity of grease is sufficient to provide lubrication for the ball bearings 74 and 78 during the life of the compressor and avoid the necessity of providing liquid lubricating oil for the wrist pin bearings and the bearings at the crank shaft end of the connecting rods.

The inner wall of the cylinder linings 36 and 44 in the low pressure head assembly, and the inner wall of the cylinder linings 82 and 84 in the high pressure head assembly are preferably plated, such as by means of a chromium composition in order to prevent the formation of rust on these surfaces. In other words, no liquid lubricating oil is provided for these surfaces, and in view of the fact that small quantities of water vapors are usually present in all gases that may be compressed, these surfaces are plated with a suitable corrosion resistant metal to prevent the formation of rust thereon. The discharge valves 66 and inlet valves (not shown) are preferably formed of stainless steel which are likewise rust resisting. The exposed parts of the crank shaft and the connecting rods and the internal surface of the crank case are carefully coated with some rust resisting paint to prevent the formation of rust thereon as a result of the small quantities of water vapor that develop during the compression of gases or air.

It will be appreciated that the friction developed in the bearings associated with the crank shaft and the wrist pins is eliminated by means of the grease sealed ball bearings. The friction developed between the pistons and the guide pistons and the walls of the cylinders and guide cylinders is eliminated by means of the prelubricated piston rings and the guide sleeves having the lubricating materials embedded therein. The compressor is thus permanently self-lubricated and it is unnecessary to supply the moving part of the compressor with liquid lubricating oils. In view of the fact that no liquid lubricating oil is employed, it is impossible for the gases compressed in the compression chambers to be contaminated with oil vapors so that substantially pure air or pure gases may be obtained in the compressed state.

While the invention has been described with reference to specific structural details of the compressor it will be appreciated that various changes may be made in the crank shaft, cylinders and pistons of the compressors. Such modifications may be made without departing from the spirit and scope of the invention as set forth in the appended claims.

I claim:
1. A compressor wherein lubricating oil is excluded from the compression chamber comprising in combination, a cylinder, a piston mounted for reciprocating movement within said cylinder, a guide cylinder aligned with said cylinder, a guide piston movable within said guide cylinder, a carbon piston ring on said piston having graphite embedded therein for maintaining a seal between the cylinder wall and the piston, a sleeve on said guide piston formed with carbon impregnated with graphite engaging the wall of the guide cylinder, means connecting the guide piston with the first piston, a crank shaft including a crank arm, anti-friction bearings supporting the crank shaft for rotation, means sealing grease within said anti-friction bearings, a rod connecting the crank arm with said guide piston, anti-friction bearings at the ends of said connecting rod, and means for maintaining grease within the last mentioned anti-friction bearings.

2. A compressor for compressing gases while excluding oil vapors therefrom comprising a compressing chamber defined by a cylinder and a main piston reciprocable therein and particularly characterized in that said piston is provided with expansible rings of dry lubricating material and with an expanding device underlying said rings and serving to expand them and maintain them in contact with the cylinder as they are worn away in use; in that said main piston is carried by a guide piston outside said compressing chamber and aligned with and spaced from said ring bearing portion; and in that said compressor has a guide cylinder in which said guide piston is slidable, said guide piston carrying a sleeve of dry lubricating material having contact with said guide cylinder throughout a substantial length thereof, said guide piston having a connecting rod pivoted thereto, and said guide piston being closed above the point of connection of said connecting rod thereto, and defining with said guide cylinder a substantially closed chamber juxtaposed below said compressor piston.

3. A compressor according to claim 2, having a crank shaft, main bearings for said crank shaft, and bearings connecting said connecting rod to said crank shaft and guide piston, said bearings being housed in a crank case underlying said cylinders and being of the substantially sealed grease packed type, said closed chamber-forming guide piston preventing any vapors emanating from said bearings from reaching said ring-carrying main piston, and said grease packed bearings and dry lubricating materials constituting the sole lubricating means of said compressor, whereby high compression may be developed over a long period of use without employment of liquid lubricant and with minimum chance for lubricant vapors to enter said compression chamber.

PAUL H. DAVEY.

REFERENCES CITED

The following references are of record in the file of this patent:

UNITED STATES PATENTS

| Number | Name | Date |
| --- | --- | --- |
| 1,091,544 | Starin | Mar. 31, 1914 |
| 1,376,857 | Bradnack | May 3, 1921 |
| 1,426,022 | Thomson | Aug. 15, 1922 |
| 1,481,936 | Thomson | Jan. 29, 1924 |
| 1,555,287 | Howe | Sept. 29, 1925 |
| 1,556,658 | Williams | Oct. 13, 1925 |
| 1,694,218 | Hazard | Dec. 4, 1928 |
| 1,722,488 | Bott et al. | July 30, 1929 |
| 1,803,591 | Bott | May 5, 1931 |
| 1,877,495 | Cater | Sept. 13, 1932 |
| 2,014,440 | Lee | Sept. 17, 1935 |
| 2,142,712 | Brandt | Jan. 3, 1939 |

FOREIGN PATENTS

| Number | Country | Date |
| --- | --- | --- |
| 110,983 | Great Britain | 1917 |
| 163,227 | Great Britain | 1921 |